(12) United States Patent
Kolhekar et al.

(10) Patent No.: US 11,482,701 B2
(45) Date of Patent: Oct. 25, 2022

(54) CYCLING PROTOCOL FOR ALKALINE BATTERIES

(71) Applicant: RESEARCH FOUNDATION OF THE CITY UNIVERSITY OF NEW YORK, New York, NY (US)

(72) Inventors: Snehal Kolhekar, New York, NY (US); Gautam G. Yadav, New York, NY (US); Jinchao Huang, New York, NY (US); Sanjoy Banerjee, New York, NY (US); Michael Nyce, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 0 days.

(21) Appl. No.: 16/634,822

(22) PCT Filed: Aug. 1, 2018

(86) PCT No.: PCT/US2018/044847
§ 371 (c)(1),
(2) Date: Jan. 28, 2020

(87) PCT Pub. No.: WO2019/028160
PCT Pub. Date: Feb. 7, 2019

(65) Prior Publication Data
US 2020/0212440 A1 Jul. 2, 2020

Related U.S. Application Data

(60) Provisional application No. 62/539,814, filed on Aug. 1, 2017.

(51) Int. Cl.
*H01M 4/13* (2010.01)
*H01M 4/50* (2010.01)
*H01M 4/131* (2010.01)
*H01M 10/44* (2006.01)

(52) U.S. Cl.
CPC ........... *H01M 4/502* (2013.01); *H01M 4/131* (2013.01); *H01M 10/44* (2013.01)

(58) Field of Classification Search
CPC ........ H01M 4/502; H01M 4/50; H01M 4/131; H01M 4/13; H01M 4/583; H01M 10/44; H01M 10/446; H01M 10/448
See application file for complete search history.

(56) References Cited

U.S. PATENT DOCUMENTS

| | | |
|---|---|---|
| 6,190,800 B1 | 2/2001 | Iltchev et al. |
| 2011/0236751 A1 | 9/2011 | Amiruddin et al. |
| 2012/0056590 A1* | 3/2012 | Amiruddin ........... H01M 10/44 429/188 |
| 2015/0311503 A1* | 10/2015 | Ingale ................... H01M 4/806 429/163 |
| 2017/0077719 A1 | 3/2017 | Onat |

FOREIGN PATENT DOCUMENTS

WO 2019028160 A1 2/2019

OTHER PUBLICATIONS

International Preliminary Report on Patentability dated Feb. 13, 2020, for International Application No. PCT/US2018/044847, filed on Aug. 1, 2018.
International Search Report and Written Opinion dated Dec. 4, 2018, for International Application No. PCT/US2018/044847, filed on Aug. 1, 2018.
India First Examination Report dated Aug. 31, 2021, for India Application No. 202017005086, filed on Aug. 1, 2018.

* cited by examiner

*Primary Examiner* — Raymond Alejandro
(74) *Attorney, Agent, or Firm* — Andrew Metrailer; Conley Rose, P.C.

(57) ABSTRACT

A method of operating a battery comprises discharging a cathode comprising manganese dioxide to within a $2^{nd}$ electron capacity of the manganese dioxide at a C-rate of equal to or slower than C/10, recharging the battery, and cycling the battery during use a plurality of times. The cathode is in a battery, and the battery comprises the cathode, an anode, a separator disposed between the anode and the cathode, and an electrolyte. The cathode comprises the manganese dioxide and a conductive carbon. The anode comprises: a metal component and a conductive carbon. The metal component can be a metal, metal oxide, or metal hydroxide, and the metal of the metal component can be zinc, lithium, aluminum, magnesium, iron, cadmium and a combination thereof.

22 Claims, 8 Drawing Sheets

6A  6B  6C 6D  6E  6F

CYCLING PROTOCOL FOR ALKALINE BATTERIES

CROSS-REFERENCE TO RELATED APPLICATIONS

This application is a filing under 35 U.S.C. 371 as the National Stage of International Application No. PCT/US2018/044847, filed on Aug. 1, 2018 and entitled, "CYCLING PROTOCOL FOR ALKALINE BATTERIES," which claims the benefit of and claims priority to U.S. Provisional Application No. 62/539,814 filed Aug. 1, 2017 and entitled "Cycling Protocol for Alkaline Batteries", both of which are incorporated herein by reference in their entirety for all purposes.

STATEMENT REGARDING FEDERALLY FUNDED RESEARCH OR DEVELOPMENT

This invention was made with government support under grant number DE-AR0000150 awarded by Advanced Research Projects Agency-Energy-U.S. Department of Energy (ARPA-E). The government has certain rights in the invention.

BACKGROUND

Alkaline primary batteries are very popular due to low cost and safe battery chemistry. Alkaline batteries contain zinc and manganese dioxide as the active material, both of which are abundant in nature, safe and inexpensive. But, primary batteries are discarded as domestic waste after only a single discharge. If they contain toxic metals like lead, cadmium and mercury they may cause serious environmental issues. Thus, rechargeable alkaline batteries are more lucrative as they help save resources by better material utilization and reducing waste. The rechargeable alkaline battery was first brought into the market by Rayovac under the tradename of 'RENEWAL' followed by Pure Energy.

SUMMARY

The following presents a simplified summary of the innovation in order to provide a basic understanding of some aspects of the systems and methods described herein. This summary is not an extensive overview. It is intended to neither identify key or critical elements of the systems and/or methods nor delineate the scope of the systems and/or methods. Its sole purpose is to present some concepts in a simplified form as a prelude to the more detailed description that is presented later.

In an embodiment, a method of operating a battery comprises discharging a cathode comprising manganese dioxide to within a $2^{nd}$ electron capacity of the manganese dioxide at a C-rate of equal to or slower than C/10, recharging the battery, and cycling the battery during use a plurality of times. The cathode is in a battery, and the battery comprises the cathode, an anode, a separator disposed between the anode and the cathode, and an electrolyte. The cathode comprises the manganese dioxide and a conductive carbon. The anode comprises: a metal component and a conductive carbon. The metal component can be a metal, metal oxide, or metal hydroxide, and the metal of the metal component can be zinc, lithium, aluminum, magnesium, iron, cadmium and a combination thereof.

In an embodiment, a method of operating a battery comprises discharging a battery, and recharging the battery without using a constant voltage step. The battery comprises: a cathode comprising the manganese dioxide and a conductive carbon, an anode comprising: a metal component and a conductive carbon, a separator disposed between the anode and the cathode, and an electrolyte. The metal component comprises a metal, metal oxide, or metal hydroxide, where the metal of the metal component is zinc, lithium, aluminum, magnesium, iron, cadmium and a combination thereof.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIGS. 6A/6D illustrate the mass of each segment (with Cu current collector) before cycling, FIGS. 6B/6E illustrate the mass of each segment (with Cu current collector) after 130 cycles, and FIGS. 6C/6F illustrate the mass of each segment (with Cu current collector) after analysis with ammonium acetate.

DETAILED DESCRIPTION

Figure 1:
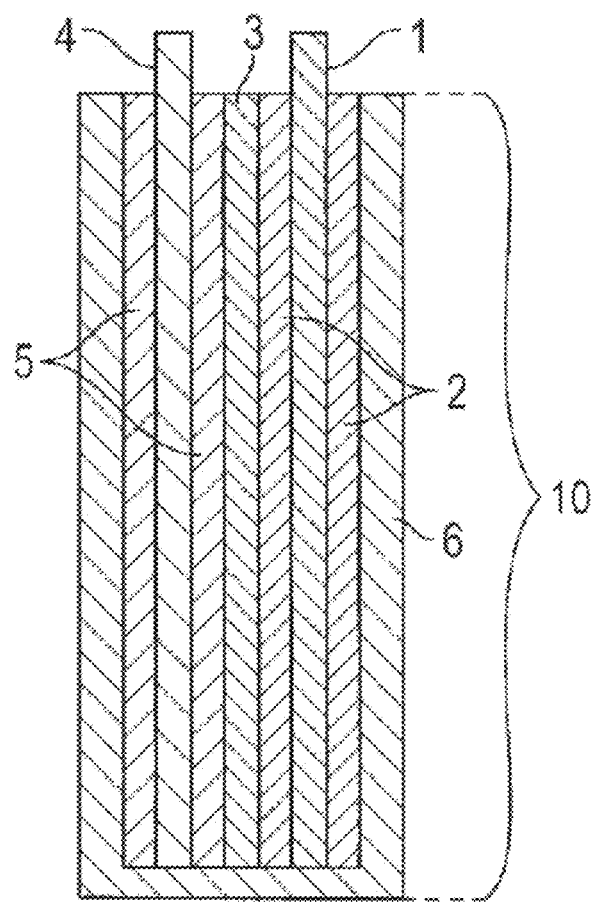
FIG. 1 is a cross section view of an embodiment of the battery in a prismatic arrangement.

The present systems and methods are best understood by reference to the detailed figure and description set forth herein.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

In this disclosure, the terms "negative electrode" and "anode" are both used to mean "negative electrode." Likewise, the terms "positive electrode" and "cathode" are both used to mean "positive electrode." Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused.

The work described in this disclosure relates generally to methods of recharging batteries and more specifically to recharging alkaline batteries to improve cycle life and material utilization.

Battery cycle life in the rechargeable batteries is severely limited due to deterioration of both Zn and $MnO_2$ electrodes during repeated charge and discharge cycles. Accessing higher depth of discharge becomes difficult due to irreversible changes that occur in both Zn and $MnO_2$. Zinc electrodes in alkaline electrolyte can form 'tree-like' dendritic structures at high current densities that can tear through the separator and cause the cell to short. Zinc electrode shape change, defined as the redistribution of active material over the current collector, is another phenomenon which can greatly deteriorates cycle life. The cathode (e.g., $\gamma$-MnO2), can be cycled for thousands of cycles at shallow depth of discharge of the $1^{st}$ electron capacity compared to its full 2 electron theoretical capacity. If the discharge proceeds into the $2^{nd}$ electron reduction capacity, irreversible oxides such as $Mn_2O_3$ and $Mn_3O_4$ are formed. This can severely reduce or kill the battery capacity. Due to the very high solubility of the zincate ion formed during the anodic discharge, the zincate ions can migrate to the cathodic compartment and form electrochemically inactive product such as hetaerolite ($ZnMn_2O_4$). This eventually leads to cell failure.

The most common methods of charging alkaline batteries use a constant current charge followed by a constant voltage charge. An exemplary charging protocol can include using constant current up to 1.72 V at higher depth of discharge of the electrolytic manganese dioxide (EMD), but this protocol has only achieved limited cycle life. Higher charging voltages have been avoided for the fear of forming higher valent manganese like $Mn^{+6}$ and $Mn^{+7}$. The 6-valent manganate disproportionates into $MnO_2$ of the rechargeable type and lower oxides of non-rechargeable type. Another charging protocol uses a constant current followed by constant voltage at 1.65 V. This protocol may be suitable for shallow $MnO_2$ depth of discharge. But as the utilization on the $MnO_2$ is increased, the battery will be charged mainly in constant voltage regime. This not only greatly increases the charging time but also produces mossy zinc morphology during charging at the anode due to low current densities reached in constant voltage charging. Mossy zinc morphology is undesirable as it leads to greater movement of the zinc. This enhances shape change. Apart from the above disadvantages of the existing charging protocols, the question of overcharge still remains elusive. Parasitic reactions like electrolyte gassing occur at higher potentials which eat up the charge otherwise meant for the desired electrochemical reactions. Hence providing a 5% to 10% overcharge is essential to return the capacity to the cell taken out previously. While various charging protocols can be used, there is still room for improvement from a charging protocol point of view if the cycle life of a Zn—$MnO_2$ battery is to be increased.

Electrochemically synthesized zinc anodes show reduced dendritic growth and shape change. As disclosed herein, one way of achieving an electrochemically synthesized zinc anode is by discharging the zinc against a cathode. This is a step that can be performed in-situ. However, when performing this procedure against a $MnO_2$ cathode there is a danger of reducing the manganese dioxide beyond a point where multi-reaction pathways are triggered resulting in irreversible oxide formation. It has been found that beyond an extent of reaction (y) of about 0.79, the reaction is no longer homogenous but includes multi-reaction mechanisms. The reactions occurring in the $MnO_2$ cathode on discharge are given below:

1$^{st}$ e$^-$ Reducion Step

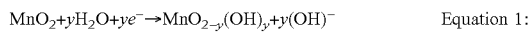

$MnO_2 + yH_2O + ye^- \rightarrow MnO_{2-y}(OH)_y + y(OH)^-$     Equation 1:

Where, y denotes the number of protons inserted per Mn atom or simply the extent of reaction. Beyond y=0.79 multi-reaction pathways occur via α-MnOOH (groutite) such as those shown below.

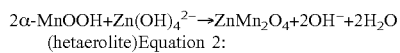

2α-MnOOH+Zn(OH)$_4$$^{2-}$→ZnMn$_2$O$_4$+2OH$^-$+2H$_2$O
(hetaerolite)Equation 2:

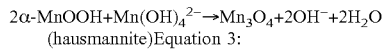

2α-MnOOH+Mn(OH)$_4$$^{2-}$→Mn$_3$O$_4$+2OH$^-$+2H$_2$O
(hausmannite)Equation 3:

The embodiments disclosed herein aim to improve the cycle life and material utilization in alkaline batteries by using a conditioning protocol during charge and discharge. These processes can be used for alkaline batteries of any size. The embodiments can be used along with other charging and discharging techniques which involve constant, variable or pulsed current and/or voltage. The charging and discharging techniques may be carried out in a single stage or in multiple stages as desired using constant, variable or pulsed current and/or voltage including intermittent rest periods of desired length. With regard to the broader scope, these processes can also be applicable to other battery systems which use other cathode materials, for example, Zn—NiOOH, Zn—Ag$_2$O, etc.

Figure 2:
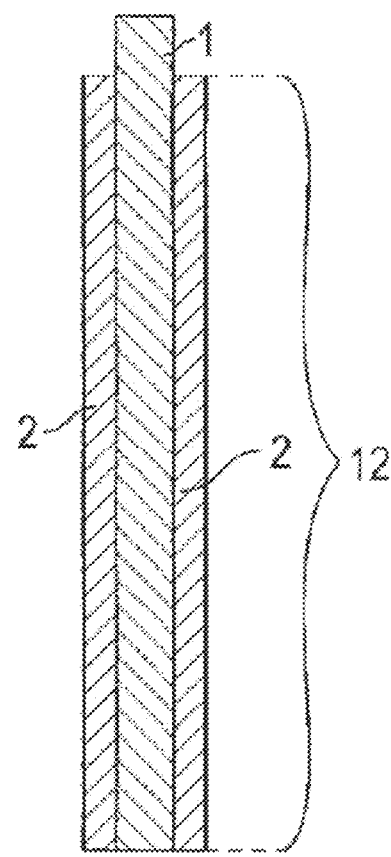
FIG. 2 is a cross section view of an embodiment of the positive electrode or cathode of the battery in a prismatic arrangement.

Referring to FIG. 1 a battery 10 has a housing 6, a cathode current collector 1, a cathode material 2, a separator 3, an anode current collector 4, and an anode material 5. FIG. 1 shows a prismatic battery arrangement. In another embodiment, the battery is a cylindrical battery. An electrolyte can be dispersed in an open space throughout battery 10. Referring to FIG. 2, the cathode current collector 1 and cathode material 2 are collectively called either the cathode 12 or the positive electrode 12. Similarly, the anode current collector 4 and the anode material 5 are collectively called either the anode or the negative electrode.

The cathode 12 can comprise a mixture of components including an electrochemically active material, a binder, a conductive material, and one or more additional components that can serve to improve the lifespan, rechargeability, and electrochemical properties of the cathode 12. The cathode 12 can be incorporated into the battery 10 which may be a secondary battery. The active cathode material can based on one or many polymorphs of $MnO_2$, including electrolytic (EMD), α-$MnO_2$, β-$MnO_2$, γ-$MnO_2$, δ-$MnO_2$, ε-$MnO_2$, or λ-$MnO_2$. Other forms of MnO2 can also be present such as pyrolusite, ramsdellite, nsutite, manganese oxyhydroxide (MnOOH), α-MnOOH, γ-MnOOH, β-MnOOH, manganese hydroxide [Mn(OH)$_2$], partially or fully protonated manganese dioxide, Mn$_3$O$_4$, Mn$_2$O$_3$, bixbyite, MnO, lithiated manganese dioxide, zinc manganese dioxide. Other active components can be present in place of or in addition to $MnO_2$ such as nickel, nickel oxyhydroxide, nickel hydroxide, silver, silver oxide, copper, copper hydroxide, lead, lead hydroxide, lead oxide, and a combination thereof. In general the cycled form of manganese dioxide in the cathode is can have a layered configuration, which in some embodiment can comprise δ-$MnO_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the $MnO_2$ second electron stage (e.g., between about 20% to about 100% of the 2$^{nd}$ electron capacity of the cathode) may be performed and subsequently recharging back to its Mn$^{4+}$ state, resulting in birnessite-phase manganese dioxide.

The addition of a conductive components such as conductive carbon enables high loadings of $MnO_2$ in the mixed material, resulting in high volumetric and gravimetric energy density. The conductive carbon can be present in a concentration between about 1-30 wt %. Such conductive carbon include single walled carbon nanotubes, multiwalled carbon nanotubes, graphene, carbon blacks of various surface areas, and others that have specifically very high surface area and conductivity. Higher loadings of the $MnO_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades(examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite, and combinations thereof. The birnessite discharge reaction comprises a dissolution-precipitation reaction where Mn$^{3+}$ ions become soluble and precipitate out on the conductive carbon as Mn$^{2+}$. This second electron process involves the formation of a non-conductive manganese hydroxide [Mn(OH)$_2$] layer on the conductive graphite.

The conductive additive can has a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. In some embodiments, the mass ratio of graphite to the conductive additive can range from about 5:1 to about 50:1, or from about 7:1 to about 28:1. The total carbon mass percentage in the cathode paste can range from about 5% to about 30% or between about 10% to about 20%.

The addition of conductive component such as metal additives to the mixed material cathode may be accomplished by addition of one or more metal powders such as nickel powder to the cathode mixture. The conductive metal additive can be present in a concentration of between about 0-30 wt %. The conductive metal additive may be, for example, nickel, copper, silver, gold, tin, cobalt, antimony, brass, bronze, aluminum, calcium, iron or platinum. In one embodiment, the conductive metal additive is a powder. In one embodiment, a second conductive metal additive is added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide [$Mn(OH)_2$] which is non-conductive. This ultimately results in a capacity fade in subsequent cycles. Suitable second additives include transition metals like Ni, Co, Fe, Ti and metals like Ag, Au, Al, Ca. Salts or such metals are also suitable. Transition metals like Co also help in reducing the solubility of $Mn^{3+}$ ions. Such conductive metal additives may be incorporated into the electrode by chemical means or by physical means (e.g. ball milling, mortar/pestle, spex mixture). An example of such an electrode comprises 5-95% birnessite, 5-95% conductive carbon, 0-50% second conductive metal additive and 1-10% binder.

In some embodiments a binder can be used. The binder can be present in a concentration of between about 0-10 wt %. In some embodiments, the binder comprises water-soluble cellulose-based hydrogels, which were used as thickeners and strong binders, and have been cross-linked with good mechanical strength and with conductive polymers. The binder may also be a cellulose film sold as cellophane. The binders were made by physically cross-linking the water-soluble cellulose-based hydrogels with a polymer through repeated cooling and thawing cycles. In one embodiment, 0-10 wt. % carboxymethyl cellulose (CMC) solution was cross-linked with 0-10 wt. % polyvinyl alcohol (PVA) on an equal volume basis. The binder, compared to the traditionally-used TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders. Using the aqueous-based binder helps in achieving a significant fraction of the two electron capacity with minimal capacity loss over many cycles. In one embodiment, the binder is water-based, has superior water retention capabilities, adhesion properties, and helps to maintain the conductivity relative to an identical cathode using a TEFLON® binder instead. Examples of hydrogels include methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In one such embodiment, a 0-10 wt % solution of water-cased cellulose hydrogen is cross linked with a 0-10 wt % solution of crosslinking polymers by, for example, repeated freeze/thaw cycles, radiation treatment or chemical agents (e.g. epichlorohydrin). The aqueous binder may be mixed with 0-5% TEFLON® to improve manufacturability.

Additional elements can be included in the cathode material including a bismuth compound and/or a copper, which together allow improved galvanostatic battery cycling of the cathode. The bismuth compound can be incorporated into the cathode 12 as an inorganic or organic salt of bismuth (oxidation states 5,4,3,2, or 1), as a bismuth oxide, or as bismuth metal (i.e. elemental bismuth). The bismuth compound can be present in the cathode material at a concentration between about 1-20 wt %. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth sub salicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth.

The copper compound can be incorporated into the cathode 12 as an organic or inorganic salt of copper (oxidation states 1,2,3 or 4), as a copper oxide, or as copper metal (i.e., elemental copper). The copper compound can be present in a concentration between about 1-70 wt %. In one embodiment, the copper compound is present in a concentration between about 5-50 wt %. In another embodiment, the copper compound is present in a concentration between about 10-50 wt %. In yet another embodiment, the copper compound is present in a concentration between about 5-20 wt %. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which will not withstand galvanostatic cycling.

The cathodes 12 can be produced using methods implementable in large-scale manufacturing. The cathode 12 is capable of delivering the full second electron capacity of 617 mAh/g of the $MnO_2$. Excellent rechargeable performance can be achieved for both low and high loadings of $MnO_2$ in the mixed material, allowing the cell/battery to achieve very high practical energy densities. In some embodiments, the cathode material can comprises 2-30% wt conductive carbon, 0-30% conductive metal additive, 1-70% wt. copper compound, 1-20% wt bismuth compound, 0-10% wt binder and birnessite or EMD. In another embodiment the cathode material comprises 2-30% wt conductive carbon, 0-30% conductive metal additive, 1-20% wt bismuth compound, 0-10% wt binder and birnessite or EMD. In one embodiment, the cathode material consists essentially of 2-30% wt conductive carbon, 0-30% conductive metal additive, 1-70% wt. copper compound, 1-20% wt bismuth compound, 0-10% wt binder and the balance birnessite or EMD. In another embodiment the cathode material consists essentially of 2-30% wt conductive carbon, 0-30% conductive metal additive, 1-20% wt bismuth compound, 0-10% wt binder and the balance birnessite or EMD.

The resulting cathode may have a porosity in the range of 20%-85% as determined by mercury infiltration porosimetry. In one embodiment, the porosity is measured according to ASTM D4284-12 "Standard Test Method for Determining Pore Volume Distribution of Catalysts and Catalyst Carriers by Mercury Intrusion Porosimetry.

The cathode paste can be formed on a current collector formed from a conductive material that serves as an electrical connection between the cathode material and an external electrical connections. In some embodiments, the cathode current collector can be, for example, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, half nickel and half copper, or any combination thereof. The cathode current collector may be formed into a mesh (e.g., an expanded mesh, woven mesh, etc.), perforated metal, foam, foil, perforated foil, wire screen, a wrapped assembly, or any combination thereof. In some embodiments, the current collector can be formed into or form a part of a pocket assembly. A tab can be coupled to the current collector to provide an electrical connection between an external source and the current collector.

In some embodiments, the anode material can comprise zinc, which can be present as elemental zinc and/or zinc oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. In an embodiment, Zn may be present in an amount of about 85 wt. %, based on the total weight of the anode material. Additional elements that can be in the anode in addition of the zinc or in place of the zinc include, but are not limited to, lithium, aluminum, magnesium, iron, cadmium and a combination thereof.

In some embodiments, ZnO may be present in an amount of from about 5 wt. % to about 20 wt. %, alternatively from about 5 wt. % to about 15 wt. %, or alternatively from about 5 wt. % to about 10 wt. %, based on the total weight of anode material. In an embodiment, ZnO may be present in anode material in an amount of about 10 wt. %, based on the total weight of the anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be present in the anode material in an amount of from about 5 wt. % to about 20 wt. %, alternatively from about 5 wt. % to about 15 wt. %, or alternatively from about 5 wt. % to about 10 wt. %, based on the total weight of the anode material. In an embodiment, the electrically conductive material may be present in anode material in an amount of about 10 wt. %, based on the total weight of the anode material. As will be appreciated by one of skill in the art, and with the help of this disclosure, the electrically conductive material is used in the Zn anode mixture as a conducting agent, e.g., to enhance the overall electric conductivity of the Zn anode mixture. Nonlimiting examples of electrically conductive material suitable for use in this disclosure include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof The anode material may also comprise a binder. Generally, a binder functions to hold the electroactive material particles (e.g., Zn used in anode, etc.) together and in contact with the current collector. The binder is present in a concentration of 0-10 wt %. The binders may comprise water-soluble cellulose-based hydrogels like methyl cellulose (MC), carboxymethyl cellulose (CMC), hydroypropyl cellulose (HPH), hydroxypropylmethyl cellulose (HPMC), hydroxethylmethyl cellulose (HEMC), carboxymethylhydroxyethyl cellulose and hydroxyethyl cellulose (HEC), which were used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be TEFLON®, which is a very resistive material, but its use in the industry has been widespread due to its good rollable properties.

In some embodiments, the binder may be present in anode material in an amount of from about 2 wt. % to about 10 wt. %, alternatively from about 2 wt. % to about 7 wt. %, or alternatively from about 4 wt. % to about 6 wt. %, based on the total weight of the anode material. In an embodiment, the binder may be present in anode material in an amount of about 5 wt. %, based on the total weight of the anode material.

A current collector can be used with an anode, including any of those described with respect to the cathode. The anode material can be pressed onto the anode current collector to form the anode. For example, the anode and/or the cathode materials can be adhered to a corresponding current collector by pressing at, for example, a pressure between 1,000 psi and 20,000 psi (between $6.9 \times 10^6$ and $1.4 \times 10^8$ Pascals). The cathode and anode materials may be adhered to the current collector as a paste. A tab of each current collector, when present, can extend outside of the device to form the current collector tab.

An alkaline electrolyte (e.g. an alkaline hydroxide, such as NaOH, KOH, LiOH, or mixtures thereof) can be contained within the free spaces of the electrodes. In some embodiments, the electrolyte can comprise an acidic solution, alkaline solution, ionic liquid, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, [M+][AlCl4−](M+)]-sulphonyl chloride or phosphoryl chloride cations, 1-ethyl-3-methylimidazolium bis (trifluoromethyl sulfonyl)imide, 1-ethyl-3-methylimidazolium trifluoromethanesulfonate, 1-butyl-1-methylpyrrolidinium bis(trifluoromethylsulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis(hexamethyldisilazide) in tetrahydrofuran and a combination thereof. The electrolyte may have a concentration of between 5 wt % and 60 wt %. The battery base electrolyte may comprise an acidic electrolyte, zinc sulfate or zinc chloride. The pH of the electrolyte can vary from 0-15. The electrolyte can be in a liquid or gelled form. When the electrolyte is in the form of a gel, the gelled electrolyte can be formed by mixing a cellulose derivative and an alkaline solution.

In some embodiments, one or more additives can be used in the electrolyte, the anode, or the cathode to control gassing during cycling of the battery. For example, bismuth, indium, indium acetate, phosphate esters, or any combination thereof can be added to the electrodes and/or electrolyte.

A separator can be disposed between the anode and the cathode when the electrodes are constructed into the battery. The separator forms an electrically insulating barrier between the anode and the cathode while being porous to hold the electrolyte and allow for ionic flow in the electrolyte between the electrodes. By being placed between the electrodes, the separator serves to prevent shorting that could occur due to direct electrical contact between the electrodes. As will be appreciated by one of skill in the art, the separator allows the electrolyte, or at least a portion and/or component thereof, to pass (e.g., cross, traverse, etc.) through the electrode separator membrane, to balance ionic flow and sustain the flow of electrons in the battery. In this regard, the separator serves to demarcate the cathode from the anode.

The separator 3 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 3 can comprise a CELGARD® brand microporous separator. In an embodiment, the separator 3 can comprise a FS 2192 SG membrane, which is a polyolefin nonwoven membrane commercially available from Freudenberg, Germany.

In some embodiments, a water-insoluble hydroxide layer can be formed and used as a layer of the separators. The water-insoluble hydroxide layer can be formed from a hydroxide of calcium, magnesium, barium, strontium and a combination thereof. A binder can be used in the water-insoluble hydroxide layer to allow the layer to be freestanding and formed as a film used as a layer of the separator.

Once constructed, the battery can be cycled during use. An initial conditioning step can be used to improve the life and cycling properties of the battery. During the initial cycling step, a layered structure of the $MnO_2$ can be formed by cycling into at least a portion of the second electron capacity of the cathode. For example, a birnessite-phase $MnO_2$ can be synthesized in situ by beginning with electrolytic manganese dioxide (EMD) in the mixed material and performing a formation step by discharging to the cathode to within the $2^{nd}$ electron capacity (617 mAh/g-$MnO_2$ or the $Mn^{2+}$ state) and recharging back to the $Mn^{4+}$ state, resulting in a layered MnO2 structure having one or more additives incorporated therein (e.g., a birnessite-phase manganese dioxide ($\delta$-$MnO_2$) having one or more of the included additives included therein).

The batteries described herein can be operated by discharging and charging the cells a plurality of times. The cells can be operated in a variety of modes such as a capacity limited charge and discharge protocol, voltage controlled charge and discharge protocols, and the like at a variety of C rates and different DOD percentages. As used herein, a C-rate is a measure of the rate at which a battery is discharged relative to its maximum capacity. A 1C rate means that the discharge current will discharge the entire battery in 1 hour, whereas a C/2 rate would discharge the entire battery in 2 hours. In some embodiments, the discharge cycles can access a portion of the second electron capacity of the $MnO_2$. The cells as described herein can maintain a ratio of an initial capacity to an operating capacity of at least about 80%, at least about 90%, or at least about 95% over at least 100 cycles, at least 150 cycles, at least 200 cycles, or at least about 250 cycles. As used herein, each cycle comprises a charge and discharge of the cell, and the initial capacity can be the peak capacity measured after the first or second cycle.

In some embodiments, an initial conditioning step can be used with the battery. The conditioning step can comprise discharging the battery to a low rate to convert a portion of the anode material to an oxide in situ. In some embodiments, the batteries can be discharged such that the cathode is cycled into at least a portion of the second electron capacity of the $MnO_2$ at a rate equal to or slower than a C/10 rate, a C/20 rate, a C/30 rate, a C/40 rate, or a C/50 rate. The cathode can be cycled into the $2^{nd}$ electron capacity at least about 5%, at least about 10%, at least about 20%, or at least about 30%.

The initial conditioning cycle can also serve to condition the anode in-situ. In some embodiments, the initial conditioning cycle can be used to form electrochemically synthesized oxides for the anode (e.g., electrochemically synthesized zinc oxide when the anode is zinc based, etc.). The generation of electrochemically synthesized metal oxides can be shown to have a lower shape change and form fewer dendrites. The ability to control the current density on the electrodes in order to control the resulting morphology of the cathode and/or anode materials can allow the state of health of the battery to be controlled or modified through the selection of the current density. In some embodiments, at least 70 wt %, at least 80 wt %, or at least 90 wt % of the active anode material can be converted into a metal oxide in the initial conditioning step.

During use, the battery can be cycled using a variety of protocols according to different power usages. In some embodiments, the cathode cycling protocol can be used for fast charging and discharging, high power density, high energy density, superior stability and reversibility. During each cycle, the depth of discharge can determine the extent to which the $1^{st}$ and $2^{nd}$ electron capacity of the MnO2 is accessed. In some embodiments, accessing the $2^{nd}$ electron capacity of the MnO2 can result in the state of charge or the crystal structure to change, which can be based on the cell potentials and/or number of electrons accessed. The resulting structural changes can include the crystal structure of the cathode being transitioned between layered-like, tunnel-like, and/or close-packed structures.

During the normal cycling of the battery, not every cycle may access the $2^{nd}$ electron capacity of the MnO2. In some embodiments, the battery can be cycled such that the number of electron accessed can range between greater than or equal to 0 and less than or equal to 0.2, greater than or equal to 0 and less than or equal to 0.5, greater than or equal to 0 and less than or equal to 1, greater than or equal to 0 and less than or equal to 1.5, greater than or equal to 0 and less than or equal to 2, greater than or equal to 0.2 and less than or equal to 0.5, greater than or equal to 0.2 and less than or equal to 1, greater than or equal to 0.2 and less than or equal to 1.5, greater than or equal to 0.2 and less than or equal to 2, greater than or equal to 0.5 and less than or equal to 1, greater than or equal to 0.5 and less than or equal to 1.5, greater than or equal to 0.5 and less than or equal to 2, greater than or equal to 1 and less than or equal to 1.5, and/or greater than or equal to 1 and less than or equal to 2.

In some embodiments, higher charging potentials can provide a higher charge density on the anode, which can help to control the morphology of the zinc formed at the anode during charging. In general, a higher current density can result in more desirable and stable zinc. In some embodiments, the cell potentials used for cycling could be between 0 and 3V vs zinc (Zn), between 0 and 2.5V vs Zn, between 0 and 2V vs Zn, between 0 and 1.8V vs Zn, between 0 and 1.65V vs Zn, between 0.8 and 3V vs Zn, between 0.8 and 2.5V vs Zn, between 0.8 and 2V vs Zn, between 0.8 and 1.8V vs Zn, between 0.8 and 1.65V vs Zn, between 1 and 3V vs Zn, between 1 and 2.5V vs Zn, between 1 and 2V vs Zn, between 1 and 1.8V vs Zn, or between 1 and 1.65V vs Zn. The potentials used for each cycle can vary and need not be the same over time. While the potentials listed herein are relative to Zn, another reference can be used to express the cycling ranges. In some embodiments, the cell potentials used for cycling could be against a general reference electrode like mercury/mercury oxide (Hg/HgO), where the potentials could be between −1.4 V and 1.6 V vs Hg/HgO, between −1.4 V and 1.1 V vs Hg/HgO, between −1.4 V and 0.6 V vs Hg/HgO, between −1.4 V and 0.4 V vs Hg/HgO, between −1.4 V and 0.25 V vs Hg/HgO, between −0.6 V and 1.6 V vs Hg/HgO, between −0.6 V and 1.1 V vs Hg/HgO, between −0.6 V and 0.6 V vs Hg/HgO, between −0.6 V and 0.4 V vs Hg/HgO, between −0.6 V and 0.25 V vs Hg/HgO, between −0.4 V and 1.6 V vs Hg/HgO, between −0.4 V and 1.1 V vs Hg/HgO, between −0.4 V and 0.6 V vs Hg/HgO, between −0.4 v and 0.4 V vs Hg/HgO, or between −0.4 V and 0.25 V vs Hg/HgO.

During the cycling of the battery, a variety of cycling processes can be used. In some embodiments, the cycling protocol and the number of electrons accessed can be through constant load, constant current, constant voltage, constant power, pulse, including periods of rest or open circuit, and the combination of thereof. Further, one or more conditioning cycles as described herein can be used between normal cycles in order to improve the life of the battery. For example, a conditioning cycle can be performed at least once every 10 cycles, performed at least once every 20 cycles, performed at least once every 30 cycles, performed at least once every 50 cycles, or performed at least once every 100.

In some embodiments, a charging protocol can comprise performing an initial conditioning step at a low C-rate. Subsequent cycles can follow a charging protocol using a constant current at about C/3 to 1.65 V followed by a constant voltage charging until the current limit was 10% of the constant current step.

In some embodiments, the battery can be charged without using a constant voltage charging step. Rather, the charging can be ended once a maximum voltage is reached. The battery can then be used or allowed to rest for a given time period before continuing to charge the battery. This process is significant as it shows the possibility of cycling a secondary zinc manganese dioxide battery without a constant-voltage charging step, which remarkably reduces the charging time for the battery. It also suggests that by increasing the charging voltage, birnessite structure can be conveniently formed in-situ while cycling a cathode, even at a relatively shallow DOD. This not only enables the formation of birnessite without any other expensive additives used, but also potentially extends the cycle life of a secondary zinc manganese dioxide battery.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

Figure 3:
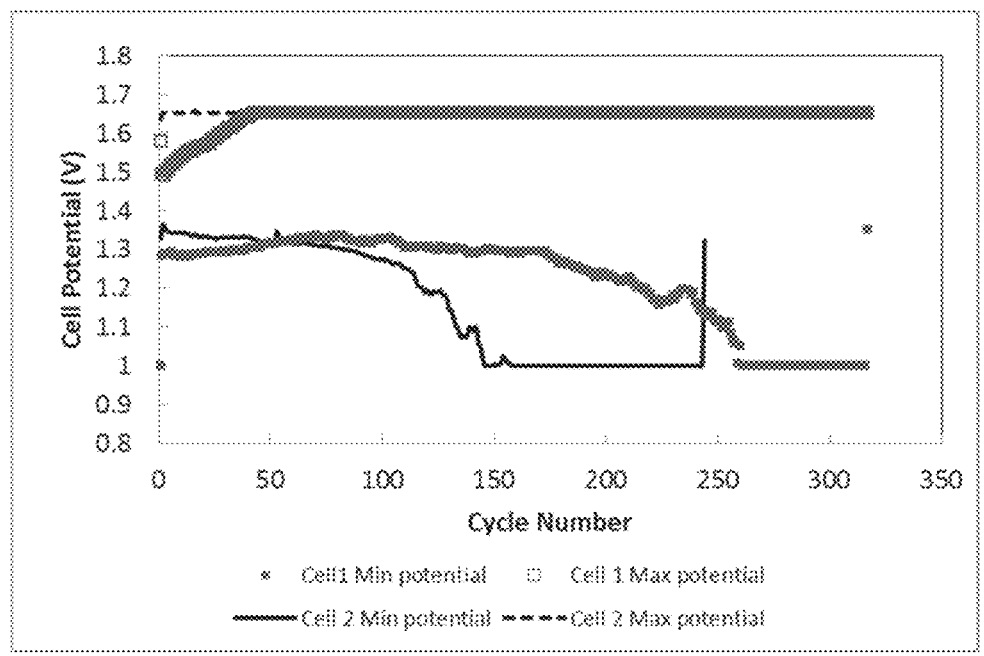
FIG. 3 is a graph illustrating the minimum and maximum potentials of Cell 1 and Cell 2 as described in Example 1.
Figure 5:
FIG. 5 is a photograph showing the zinc penetration and separator pore plugging in the zinc and zinc oxide cell separators described in Example 1.

In this example, two cells comprising of 2 anodes and 3 cathodes were assembled with excess cathode capacity. γ-$MnO_2$ formed the cathode active material and pasted Zn formed the anode active material. Electrolyte used was 37% KOH. The cathode was wrapped with three layers of cellophane separator. The discharging and charging protocol is discussed as follows. The cell 1 was first deep discharged at C/50 rate. This converted 90% of the zinc into zinc oxide in-situ. This was done because electrochemically synthesized zinc oxide anode shows less shape change and dendrites. This is followed by charging at C/3 to 12% depth of discharge of the zinc twice with an intermediate rest. Subsequent cycling occurred at 12% depth of discharge of the zinc and 8% depth of discharge of the $MnO_2$. The maximum potential limit was 1.65 V. Charging protocol consisted of constant current at C/3 to 1.65 V followed by constant voltage charging until the current limit was 10% of the constant current step. Cell 2 did not receive any conditioning step at the beginning or in between cycling and was cycled at 12% depth of discharge of the zinc. Its charging protocol consisted of using a constant current charge at C/3 until the voltage limit of 1.65 V is hit. This is followed by constant voltage charging until a current limit of 10% of the constant current is hit. It can be clearly seen in FIG. 3, the advantage of conditioning step at the beginning of cycling. In cell 1, we are cycling electrochemically synthesized zinc oxide anode instead of the zinc anode (cell 2). Cell 1 cycled for 260 cycles before hitting the 1V minimum voltage while cell 2 started showing capacity fade after 150 cycles. The cells were carefully dissembled and their separators were checked for zinc penetration. FIG. 5 shows all the 6 layers of cellophane separator from cell 1 and cell 2. It is evident from here that cell 2 must have died due to zinc shorting because of uncontrollable zinc growth into the separator. Thus the conditioning step improved the cycle life by reducing zinc penetration through the separator.

Figure 4:
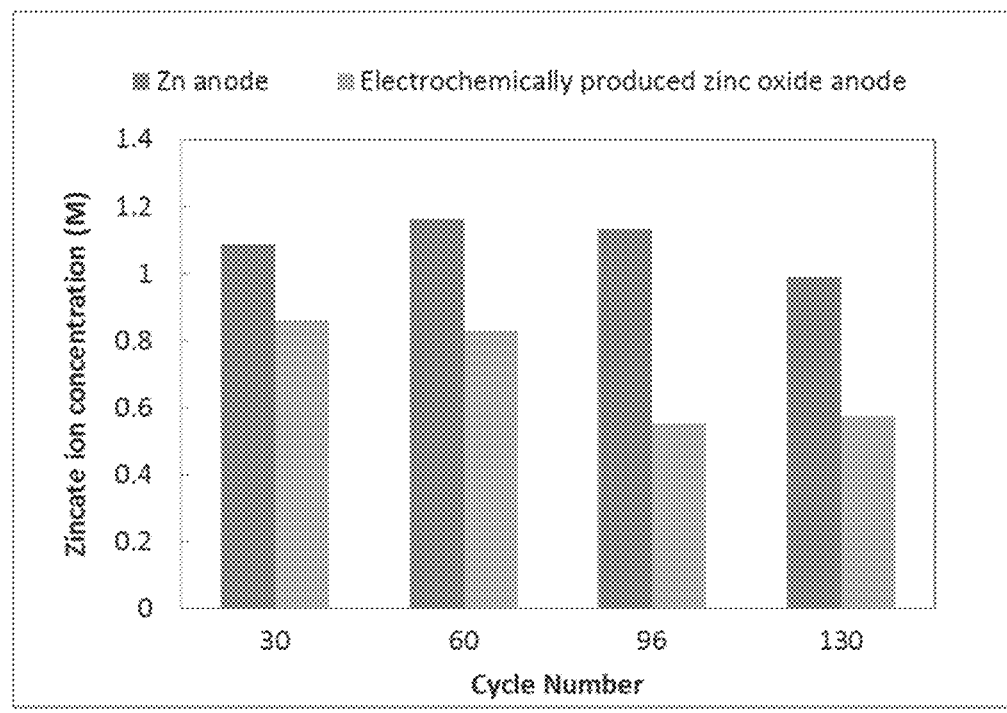
FIG. 4 is a graph illustrating the zincate ion concentration in the bulk electrolyte measured at respective cycle lives in the zinc and zinc oxide cells as described in Example 1.
Figure 6:
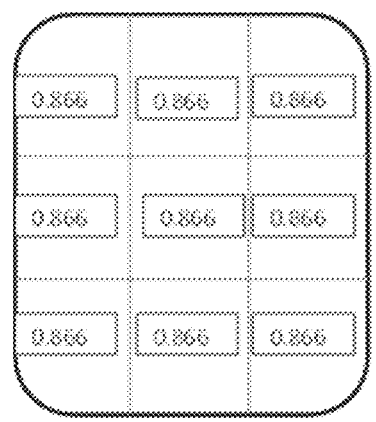
FIGS. 6A-6F illustrate the shape change analysis in the zinc and zinc oxide cells after cycle 130 as described in Example 1.
Figure 6:
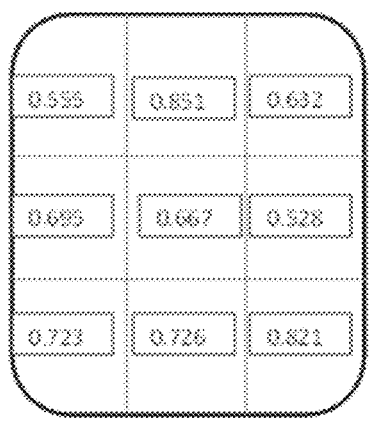
Figure 6:
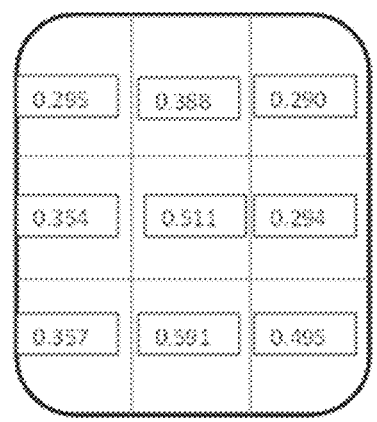
Figure 6:
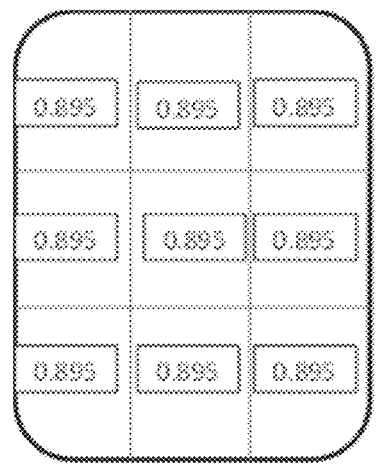
Figure 6:
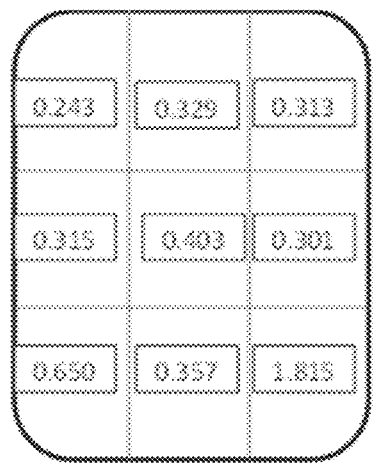
Figure 6:
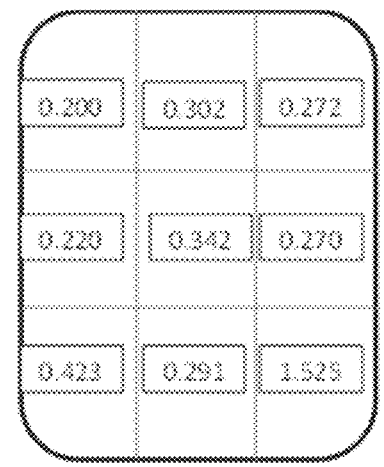

To further understand the difference in cycling of a zinc anode with large particle distribution and electrochemically produced zinc oxide anode from finer zinc particles, several experiments were conducted where the two types of cells were stopped at various cycles (cycle 30, 66, 96,130). The bulk electrolyte was analyzed for zincate ion concentration. FIG. 4 shows the zincate ion concentration as a function of cycle life in the two types of cells. The electrolyte in the zinc anode cells was supersaturated with zincate ions. On the other hand, the electrolyte in the zinc oxide cells consistently showed lower zincate ion concentration throughout the life of the battery. This shows that the zinc oxide anode has lower tendency to lose active material to the cathodic compartment and hence must also reduce active material redistribution. FIG. 6 shows a mass balance done on the two types of cells after 130 cycles. The anodes were cut in 9 segments and their masses were weighed before (6A, 6D) and after cycling (6B, 6E). FIGS. 6C and 6F show the masses after completely dissolving zinc oxide from each segment. It is assumed that the mass of copper current collector and Teflon does not change. From the data shown above it is evident that the active material retention of the zinc oxide anode was appreciably better than that in zinc anode. FIGS. 6A and 6D show that the initial mass is very similar. FIG. 6E clearly indicates the direction of movement of active material after 130 cycles is from the top portion towards the center and towards the bottom outer corners. The difference in the masses of FIGS. 6B/6E and 6C/6F gives us the active material in the form of zinc oxide. Clearly, the zinc oxide battery shows reduced sign of zinc redistribution as more active material is in the form of zinc oxide.

Example 2

Figure 7:
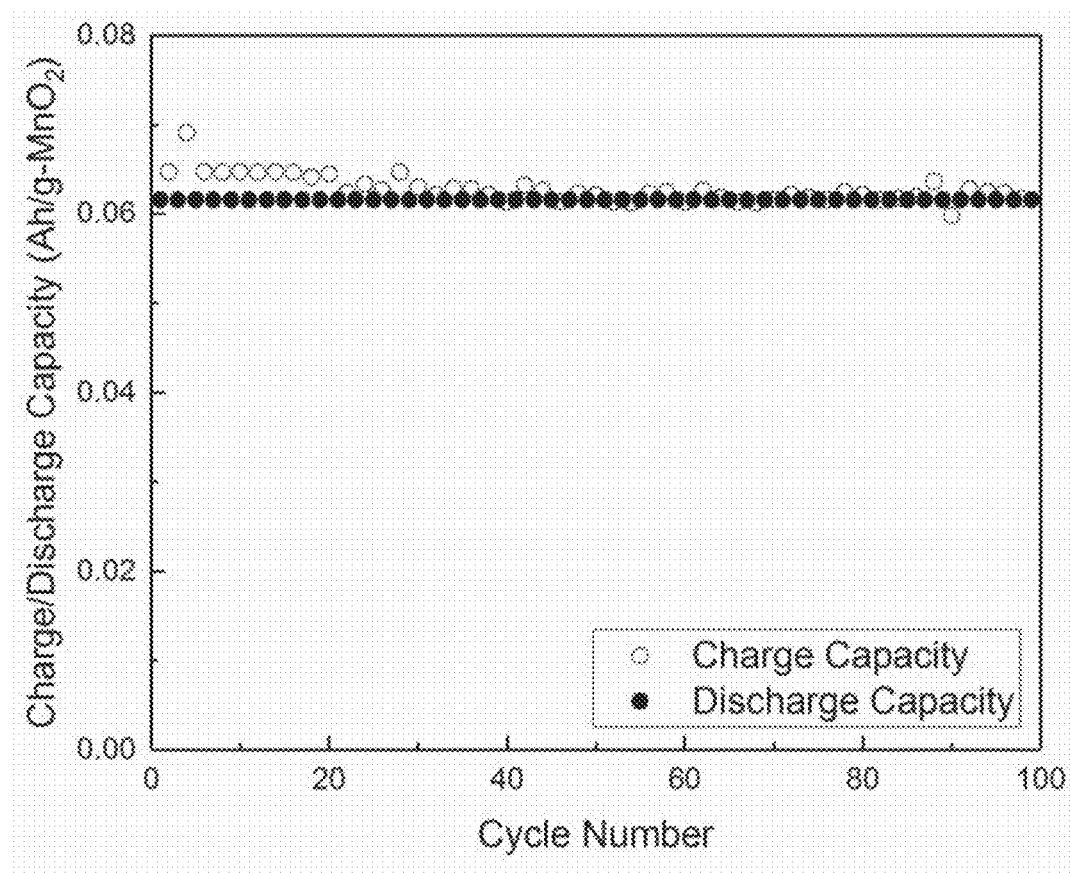
FIG. 7 illustrates the charge and discharge capacities for the cell described in Example 2.
Figure 8:
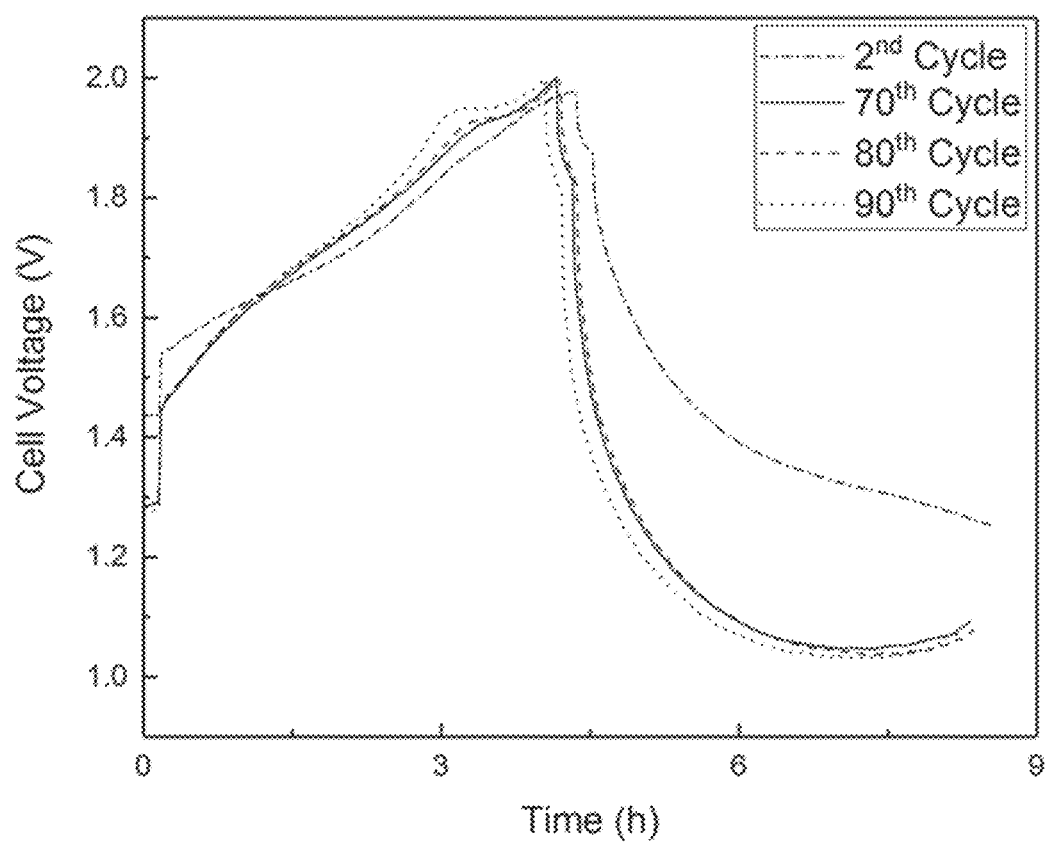
FIG. 8 illustrates the voltage curve change for the cell as described in Example 2.
Figure 9A:
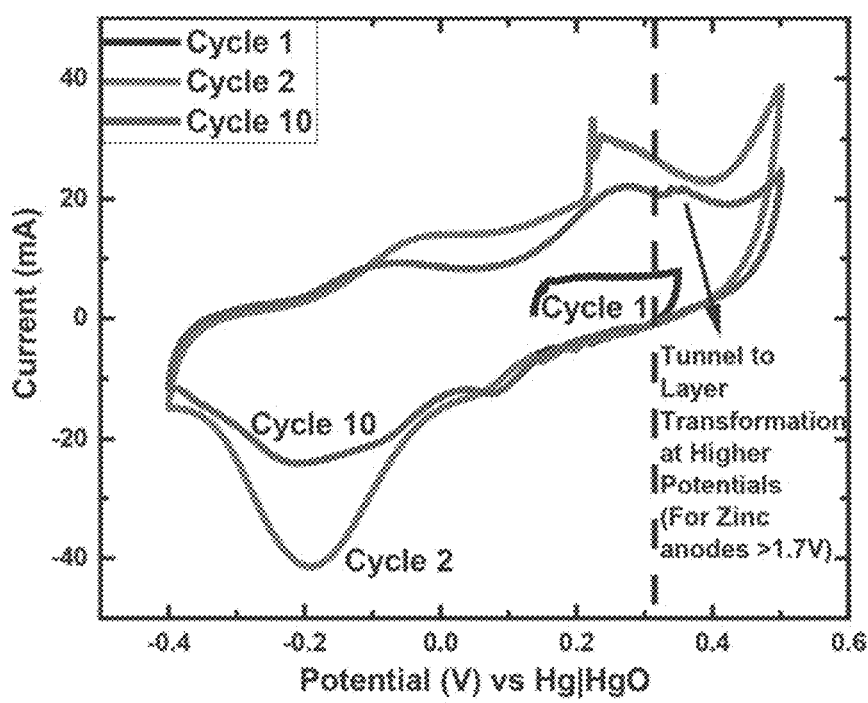
FIGS. 9A and 9B illustrate the charging and discharging characteristics of the cell described in Example 2.
Figure 9B:
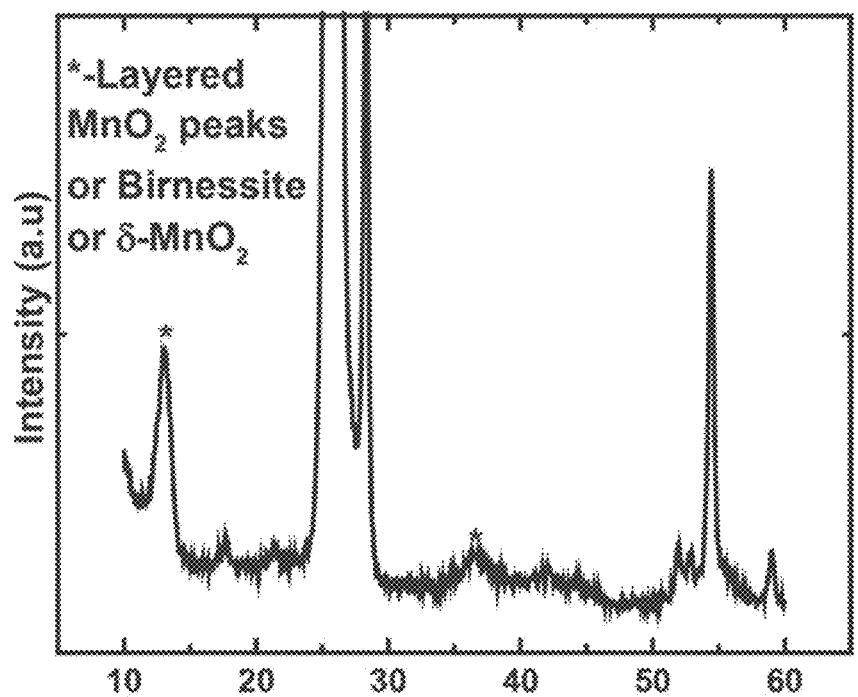

Another cell comprising one cathode and two anodes was assembled. Electrolytic $\gamma$-$MnO_2$ (EMD) was used as the cathode material, and the anode was a pasted zinc electrode. The electrolyte used was 25 wt % KOH solution, and the separator was polyvinyl alcohol membrane. The cell was cycled with a depth of discharge (DOD) at 20% of the first full electron capacity of EMD (theoretically 0.308 Ah/g-$MnO_2$). It was charged with constant current at the rate of C/4 (C means 20% of the $1^{st}$ electron capacity of EMD) until the cell voltage reached 2V or the desired charge capacity (20% DOD with 5% overcharge) was achieved, whichever occurred first. No constant voltage charging step was used, which usually occurs in conventional charging protocols for secondary zinc manganese dioxide batteries. The charging process was then terminated and a constant-current discharge process at the rate of C/4 was followed until the accomplishment of 20% DOD or until the cutoff voltage at 1V was reached. FIG. 7 shows the charge and discharge capacities for the cell. Its discharge capacity was stably achieved for 100 cycles. It was able to achieve the 5% overcharge for the first 20 cycles, without taking a constant voltage charge step. The charge capacity dropped slightly in later cycles, but the cell's coulombic efficiency was able to stay below 100%. No significant side effect was observed at this voltage range for 100 cycles, as no drop in the cell's discharge capacity occurred. FIG. 8 shows the voltage curve change for the cell. Starting from the $70^{th}$ cycle, the charge and discharge started to show characteristic curves of a zinc birnessite (a layered manganese oxide) cell. The hump occurred in the charge half cycle around 1.9 V belongs to the oxidation of $Mn^{III}$ to $Mn^{IV}$ to form layered birnessite structure, while the discharge voltage curve flatten out between 1.0V and 1.1V attributes to the dissolution and precipitation process for birnessite reduction[6]. The above result is very significant as it shows the possibility of cycling a secondary zinc manganese dioxide battery without a constant-voltage charging step, which remarkably reduces the charging time for the battery. It also suggests that by increasing the charging voltage, birnessite structure can be conveniently formed in-situ while cycling an EMD cathode, even at a relatively shallow DOD (FIGS. 9A and 9B). This not only enables the formation of birnessite without any other expensive additives used, but also potentially extends the cycle life of a secondary zinc manganese dioxide battery.

Example 3

Figure 10:
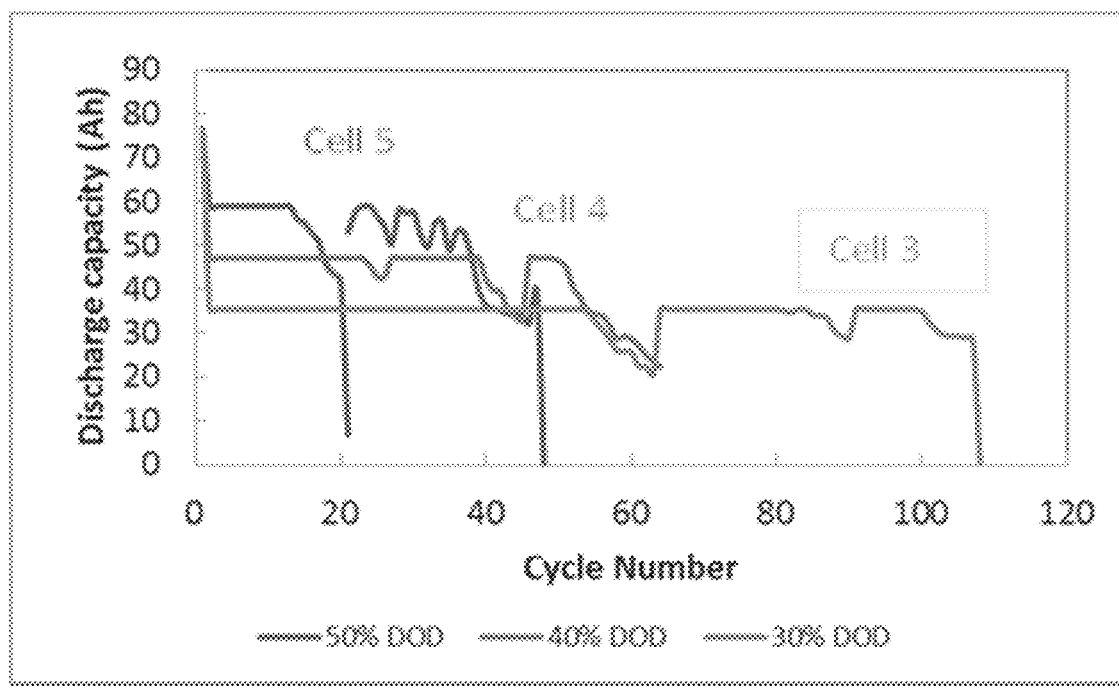
FIG. 10 illustrates the cycle life performance of Cell 3, Cell 4, and Cell 5 as described in Example 3.
Figure 11:
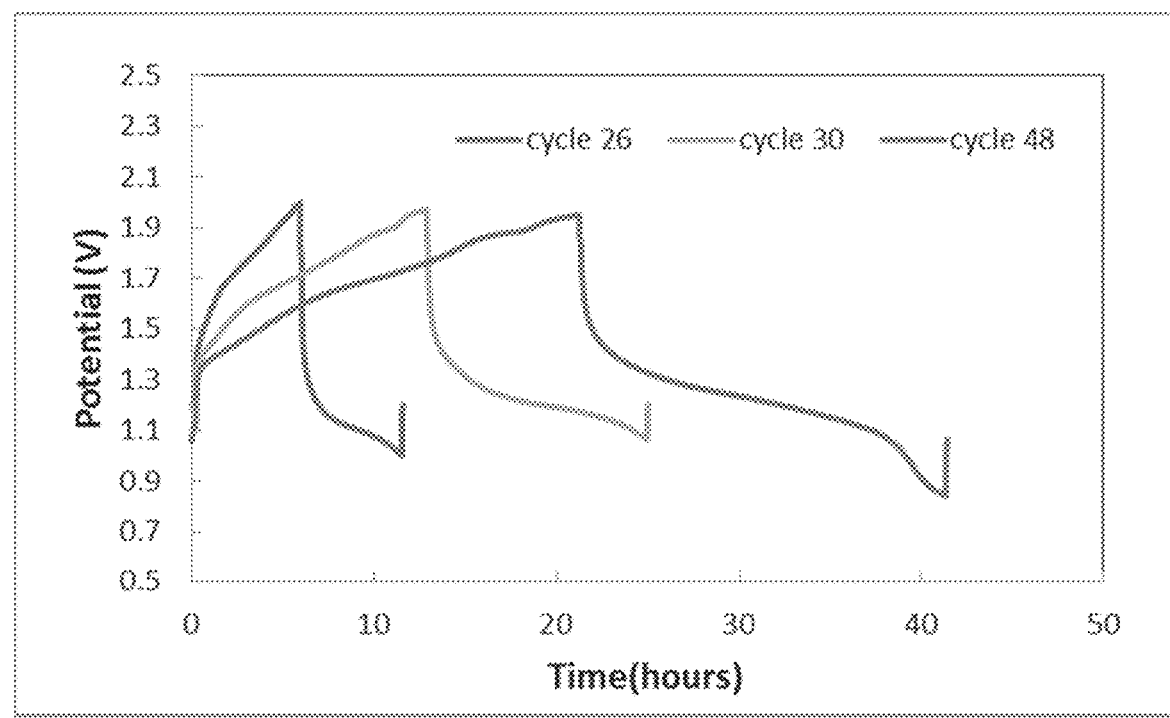
FIG. 11 illustrates the potential curves for cell 4 as described in Example 3.

In another example, 3 dry cells containing 10 cathodes and 11 anodes were directly obtained from a company. The full $1^{st}$ electron capacity of each cell was 118 Ah and the anode capacity was in excess, 285 Ah. The cathodes were $\gamma$-$MnO_2$ and anodes were zinc. The electrolyte used was 25% KOH. The electrodes were 3"×6" and were given plenty of time to soak in the electrolyte. Cell 3 is cycled at 30% depth of discharge of the $1^{st}$ electron of $MnO_2$. Cell 4 is cycled at 40% depth of discharge of the $1^{st}$ electron of $MnO_2$. Cell 5 is cycled at 50% depth of discharge of the $1^{st}$ electron of $MnO_2$. The charging protocol consisted of providing a deep discharge to 65% of the $1^{st}$ electron of $MnO_2$ over 50 hours. This is followed by charging the respective cells to 30%, 40% and 50% of the first full discharge twice with an intermediate rest step. Subsequent cycling is carried out at the respective depth of discharge for each cell via constant current to 2V. Therefore, the charge termination criteria are coulomb counting along with voltage limit, whichever occurs first. The discharge protocol consists of constant current at C/6 to 1 V. From FIG. 10, it is seen that the cycle life of cell 3 which is cycled at C/6 at 30% depth of discharge of the $1^{st}$ electron has achieved 100 cycles. Cell 4 cycled for 24 cycles before hitting the minimum discharge limit of 1 V. Cell 5 cycled for 13 cycles at C/6 rate before hitting the 1 V limit criteria. In order to save the cell from dying, two approaches have been suggested. One, where the charge and discharge rate are reduced to half and two, where the discharge end potential is lowered to 0.9 V (FIG. 11). Doing so resulted in increase of the discharge end voltage to 1.05 V on cycle 29 for cell 4 and both the charge and discharge capacity was successfully achieved with the 5% overcharge. The aforementioned procedure was adopted to save the cells (cell 3, cell 4 and cell 5) after which the cell was able to deliver the desired charge and discharge capacity for few more cycles.

Having described a number of processes and devices herein, various embodiments can include, but are not limited to:

A first embodiment includes a battery comprising: a cathode comprising of a metal or metal oxide or metal hydroxide, where the metal is manganese, nickel, silver, lead, copper and a combination thereof, a conductive carbon and/or binder, an anode comprising of a metal or metal oxide or metal hydroxide, where the metal is zinc, lithium, aluminum, magnesium, iron, cadmium and a combination thereof, a conductive carbon and/or binder; an electrolyte; and a separator disposed between the anode and the cathode.

A second embodiment can include the battery of the first embodiment, wherein the battery is used for fast charging and discharging, high power density, high energy density and is of superior stability and reversibility.

A third embodiment can include the battery of the first or second embodiment, wherein the metal or metal oxide or metal hydroxide is manganese dioxide($MnO_2$), electrolytic manganese dioxide, natural manganese dioxide, chemically modified manganese dioxide, $\alpha$-$MnO_2$, $\beta$-$MnO_2$, $\gamma$-$MnO_2$, $\delta$-$MnO_2$, $\varepsilon$-$MnO_2$, $\lambda$-$MnO_2$, birnessite, pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide, nickel, nickel oxyhydroxide, nickel hydroxide, silver, silver oxide, copper, copper hydroxide, lead, lead hydroxide, lead oxide, and a combination thereof.

A fourth embodiment can include the battery of any one of the first to third embodiments, A battery as recited in claim 1-3, wherein the conductive carbon is TIMREX Primary Synthetic Graphite (all types), TIMREX Natural Flake Graphite (all types), TIMREX MB, MK, MX, KC, B, LB Grades(examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite and combinations thereof.

A fifth embodiment can include the battery of any one of the first to fourth embodiments, wherein the binder can be Teflon, carboxymethyl cellulose, polyvinyl alcohol, polyvinylidene fluoride and combination thereof.

A sixth embodiment can include the battery of any one of the first to fifth embodiments, wherein the cathode cycling protocol or method is responsible for fast charging and discharging, high power density, high energy density, superior stability and reversibility.

A seventh embodiment can include the battery of any one of the first, second, or sixth embodiments, wherein the cathode cycling protocol or method alters the state of charge or the crystal structure through cycling between cell potentials or number of electrons accessed.

An eighth embodiment can include the battery of any one of the first, second, sixth, or seventh embodiments, wherein the cell potentials used for cycling could be between 0 and 3V vs zinc (Zn), 0 and 2.5V vs Zn, 0 and 2V vs Zn, 0 and 1.8V vs Zn, 0 and 1.65V vs Zn, 0.8 and 3V vs Zn, 0.8 and 2.5V vs Zn, 0.8 and 2V vs Zn, 0.8 and 1.8V vs Zn, 0.8 and 1.65V vs Zn, 1 and 3V vs Zn, 1 and 2.5V vs Zn, 1 and 2V vs Zn, 1 and 1.8V vs Zn and 1 and 1.65V vs Zn and a combination of these ranges.

A ninth embodiment can include the battery of any one of the first, second, sixth, or seventh embodiments, wherein the cell potentials used for cycling could be against a general reference electrode like mercury/mercury oxide (Hg/HgO), where the potentials could be −1.4 V and 1.6 V vs Hg/HgO, −1.4 V and 1.1 V vs Hg/HgO, −1.4 V and 0.6 V vs Hg/HgO, −1.4 V and 0.4 V vs Hg/HgO, −1.4 V and 0.25 V vs Hg/HgO, −0.6 V and 1.6 V vs Hg/HgO, −0.6 V and 1.1 V vs Hg/HgO, −0.6 V and 0.6 V vs Hg/HgO, −0.6 V and 0.4 V vs Hg/HgO, −0.6 V and 0.25 V vs Hg/HgO, −0.4 V and 1.6 V vs Hg/HgO, −0.4 V and 1.1 V vs Hg/HgO, −0.4 V and 0.6 V vs Hg/HgO, −0.4 v and 0.4 V vs Hg/HgO, −0.4 V and 0.25 V vs Hg/HgO and combinations of these ranges.

A tenth embodiment can include the battery of any one of the first, second, sixth, or seventh embodiments, wherein the number of electron accessed can range between greater than or equal to 0 and less than or equal to 0.2, greater than or equal to 0 and less than or equal to 0.5, greater than or equal to 0 and less than or equal to 1, greater than or equal to 0 and less than or equal to 1.5, greater than or equal to 0 and less than or equal to 2, greater than or equal to 0.2 and less than or equal to 0.5, greater than or equal to 0.2 and less than or equal to 1, greater than or equal to 0.2 and less than or equal to 1.5, greater than or equal to 0.2 and less than or equal to 2, greater than or equal to 0.5 and less than or equal to 1, greater than or equal to 0.5 and less than or equal to 1.5, greater than or equal to 0.5 and less than or equal to 2, greater than or equal to 1 and less than or equal to 1.5, greater than or equal to 1 and less than or equal to 2 and a combination of these electron ranges.

An eleventh embodiment can include the battery of any one of the first, second, third, sixth, seventh, eighth, or ninth embodiments, wherein the cycling protocol or method and the number of electrons accessed can be through constant load, constant current, constant voltage, constant power, pulse, including periods of rest or open circuit and the combination of thereof.

A twelfth embodiment can include the battery of any one of the first, second, third, sixth, seventh, eighth, ninth, tenth, or eleventh embodiments, wherein the crystal structure of the cathode can transition between layered-like, tunnel-like and close-packed structures.

A thirteenth embodiment can include the battery of any one of the first, second, third, or eleventh embodiments, wherein the battery is conditioned by discharging to 20% to 100% of the full 2 electron capacity at the beginning, at any intermediate cycle and at regular intervals for one or more than one times.

A fourteenth embodiment can include the battery of any one of the first, second, third, seventh, eighth, ninth, or tenth embodiments, wherein the state of health of the battery is controlled by modifying the current density.

A fifteenth embodiment can include the battery of any one of the first, third, fourth, or fifth embodiments, wherein the composition of the cathode is greater than or equal to 0 wt % and less than or equal to 10 wt % binder, greater than or equal to 10 wt % to less than or equal to 90 wt % conductive carbon and the balance covered by the metal or metal oxide or metal hydroxide.

A sixteenth embodiment can include the battery of any one of the first or second embodiments, wherein the metal, metal oxide, metal hydroxide in the anode can be zinc, zinc oxide, electrodeposited zinc from alkaline/acidic solutions, lithium, aluminum, magnesium, iron, cadmium and a combination thereof.

A seventeenth embodiment can include the battery of any one of the first, second, fourth, fifth, or fifteenth embodiments, wherein the composition of the anode is greater than or equal to 0 wt % and less than or equal to 10 wt % binder, greater than or equal to 10 wt % to less than or equal to 90 wt % conductive carbon and the balance covered by the metal or metal oxide or metal hydroxide.

An eighteenth embodiment can include the battery of any one of the first to seventeenth embodiments, wherein the electrolyte is acidic, alkaline, ionic liquids, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, $[M^+][AlCl_4^-](M^+)]$-sulphonyl chloride or phosphoryl chloride cations, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethyl sulfonyl) imide, 1-hexyl-3-methylimidazolium hexafluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis(hexamethyldisilazide) in tetrahydrofuran and a combination thereof.

A nineteenth embodiment can include the battery of any one of the first to seventeenth embodiments, wherein the composition of the electrolyte is greater than or equal to 0 wt % to less than or equal to 60 wt % of potassium hydroxide, sodium hydroxide, lithium hydroxide, cesium hydroxide, strontium hydroxide and combinations thereof.

A twentieth embodiment can include the battery of any one of the first, second, fifteenth, seventeenth, or eighteenth embodiments, A battery as recited in claims 1, 2, 15, 17 and 18, wherein gassing in the battery is controlled by the addition of bismuth, indium, indium acetate, phosphate esters to the electrodes and electrolyte.

A twenty first embodiment can include the battery of any one of the first to twentieth embodiments, wherein the separator is cellophane (all types), Freudenberg (all types), celgard (all types), water-insoluble hydroxide layer and a combination thereof.

A twenty second embodiment can include the battery of any one of the first to twentieth embodiments, wherein the water-insoluble hydroxide layer is from a group of calcium, magnesium, barium, strontium and a combination thereof.

A twenty third embodiment can include the battery of any one of the first, fourteenth, or sixteenth embodiments, wherein the cathodes and anodes are pressed on nickel, copper, tin, platinum, silver, gold, stainless steel 316, titanium and magnesium current collector and a combination thereof.

In a twenty fourth embodiment, a method of operating a battery comprises: discharging a cathode comprising manganese dioxide to within a $2^{nd}$ electron capacity of the manganese dioxide at a C-rate of equal to or slower than C/10, wherein the cathode is in a battery, and wherein the battery comprises: the cathode comprising the manganese dioxide, and a conductive carbon, an anode comprising: a metal component and a conductive carbon, wherein the metal component comprises a metal, metal oxide, or metal hydroxide, where the metal of the metal component is zinc, lithium, aluminum, magnesium, iron, cadmium and a combination thereof, a separator disposed between the anode and the cathode, and an electrolyte; recharging the battery; and cycling the battery during use a plurality of times.

A twenty fifth embodiment can include the method of the twenty fourth embodiment, wherein the discharging of the battery occurs prior to an initial recharging step for the battery.

A twenty sixth embodiment can include the method of the twenty fourth or twenty fifth embodiment, wherein the anode comprises a metal, and wherein the discharging step is an initial discharging step for the battery that forms a metal oxide in-situ.

A twenty seventh embodiment can include the method of the twenty sixth embodiment, wherein at least 70 wt % of the metal of the anode is converted to a metal oxide in the initial discharging step.

A twenty eighth embodiment can include the method of any one of the twenty fourth to twenty seventh embodiments, further comprising: converting at least a portion of the manganese dioxide to a layered MnO2 structure in response to discharging the cathode to within the $2^{nd}$ electron capacity of the manganese dioxide.

A twenty ninth embodiment can include the method of any one of the twenty fourth to twenty eighth embodiments, wherein cycling the battery during use comprises: cycling the battery without a constant voltage step.

A thirtieth embodiment can include the method of any one of the twenty fourth to twenty ninth embodiments, wherein discharging the cathode to within the $2^{nd}$ electron capacity of the manganese dioxide comprises discharging the cathode to at least 20% of a full $2^{nd}$ electrode capacity of the cathode.

A thirty first embodiment can include the method of any one of the twenty fourth to thirtieth embodiments, wherein the manganese dioxide comprises manganese dioxide ($MnO_2$), electrolytic manganese dioxide, natural manganese dioxide, chemically modified manganese dioxide, $\alpha$-$MnO_2$, $\beta$-$MnO_2$, $\gamma$-$MnO_2$, $\delta$-$MnO_2$, $\varepsilon$-$MnO_2$, $\lambda$-$MnO_2$, birnessite, pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide, or any combination thereof.

A thirty second embodiment can include the method of any one of the twenty fourth to thirty first embodiments, wherein the cathode further comprises: nickel, nickel oxyhydroxide, nickel hydroxide, silver, silver oxide, copper, copper hydroxide, lead, lead hydroxide, lead oxide, and a combination thereof.

A thirty third embodiment can include the method of any one of the twenty fourth to thirty second embodiments, wherein the conductive carbon is TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite and combinations thereof.

A thirty fourth embodiment can include the method of any one of the twenty fourth to thirty third embodiments, wherein the cathode further comprises a binder, and wherein the binder comprises polytetrafluoroethylene, carboxymethyl cellulose, polyvinyl alcohol, polyvinylidene fluoride, or any combination thereof.

A thirty fifth embodiment can include the method of any one of the twenty fourth to thirty fourth embodiments, wherein the electrolyte is acidic, alkaline, ionic liquids, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, [M$^+$] [AlCl$_4$$^-$](M+)]-sulphonyl chloride or phosphoryl chloride cations, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethyl sulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis (hexamethyldisilazide) in tetrahydrofuran and a combination thereof.

In a thirty sixth embodiment, a method of conditioning a battery comprises: discharging a battery, wherein the battery comprises: a cathode comprising the manganese dioxide and a conductive carbon, an anode comprising: a metal component and a conductive carbon, wherein the metal component comprises a metal, metal oxide, or metal hydroxide, where the metal of the metal component is zinc, lithium, aluminum, magnesium, iron, cadmium and a combination thereof, a separator disposed between the anode and the cathode, and an electrolyte; and recharging the battery without using a constant voltage step.

A thirty seventy embodiment can include the method of the thirty sixth embodiment, further comprising: discharging the cathode to within the 2nd electron capacity of the manganese dioxide to at least 20% of a full $2^{nd}$ electrode capacity of the cathode.

A thirty eighth embodiment can include the method of the thirty sixth or thirty seventh embodiment, wherein the manganese dioxide comprises manganese dioxide($MnO_2$), electrolytic manganese dioxide, natural manganese dioxide, chemically modified manganese dioxide, $\alpha$-$MnO_2$, $\beta$-$MnO_2$, $\gamma$-$MnO_2$, $\delta$-$MnO_2$, $\epsilon$-$MnO_2$, $\lambda$-$MnO_2$, birnessite, pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide, or any combination thereof.

A thirty ninth embodiment can include the method of any one of the thirty sixth to thirty eighth embodiments, wherein the cathode further comprises: nickel, nickel oxyhydroxide, nickel hydroxide, silver, silver oxide, copper, copper hydroxide, lead, lead hydroxide, lead oxide, and a combination thereof.

A fortieth embodiment can include the method of any one of the thirty sixth to thirty ninth embodiments, wherein the conductive carbon is TIMREX Primary Synthetic Graphite (all types), TIMREX Natural Flake Graphite (all types), TIMREX MB, MK, MX, KC, B, LB Grades(examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite and combinations thereof.

A forty first embodiment can include the method of any one of the thirty sixth to fortieth embodiments, wherein the cathode further comprises a binder, and wherein the binder comprises polytetrafluoroethylene, carboxymethyl cellulose, polyvinyl alcohol, polyvinylidene fluoride, or any combination thereof.

A forty second embodiment can include the method of any one of the thirty sixth to forty first embodiments, wherein the electrolyte is acidic, alkaline, ionic liquids, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, [$M^+$][$AlCl_4^-$]($M^+$)]-sulphonyl chloride or phosphoryl chloride cations, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethylsulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis (hexamethyldisilazide) in tetrahydrofuran and a combination thereof.

A forty third embodiment can include the method of any one of the thirty sixth to forty second embodiments, wherein the discharging and recharging occur between upper and lower cell potentials, and wherein the upper and lower cell potentials used are between 0 and 3V vs zinc (Zn).

A forty fourth embodiment can include the method of any one of the thirty sixth to forty third embodiments, wherein the discharging and recharging occur between upper and lower cell potentials, and wherein the upper and lower cell potentials used are between −1.4 V and 1.6 V vs Hg/HgO.

A forty fifth embodiment can include the method of any one of the thirty sixth to forty fourth embodiments, wherein a number of electrons accessed during the discharging can range between greater than or equal to 0 and less than or equal to 0.2, greater than or equal to 0 and less than or equal to 0.5, greater than or equal to 0 and less than or equal to 1, greater than or equal to 0 and less than or equal to 1.5, greater than or equal to 0 and less than or equal to 2, greater than or equal to 0.2 and less than or equal to 0.5, greater than or equal to 0.2 and less than or equal to 1, greater than or equal to 0.2 and less than or equal to 1.5, greater than or equal to 0.2 and less than or equal to 2, greater than or equal to 0.5 and less than or equal to 1, greater than or equal to 0.5 and less than or equal to 1.5, greater than or equal to 0.5 and less than or equal to 2, greater than or equal to 1 and less than or equal to 1.5, or greater than or equal to 1 and less than or equal to 2.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of operating a battery, the method comprising:
    discharging a cathode comprising manganese dioxide to within a $2^{nd}$ electron capacity of the manganese dioxide at a C-rate of equal to or slower than C/10, wherein the manganese is in the form of $Mn^{4+}$ in the manganese dioxide, and wherein at least a portion of the manganese is converted to $Mn^{2+}$ during the discharging, wherein the cathode is in a battery, and wherein the battery comprises:
        the cathode comprising the manganese dioxide, and a conductive carbon,
        an anode comprising: a metal component and a conductive carbon, wherein the metal component comprises a metal, metal oxide, or metal hydroxide, where the metal of the metal component is zinc, lithium, aluminum, magnesium, iron, cadmium and a combination thereof,
        a separator disposed between the anode and the cathode, and
        an electrolyte;
    recharging the battery; and
    cycling the battery during use a plurality of times.

2. The method of claim 1, wherein the discharging of the battery occurs prior to an initial recharging step for the battery.

3. The method of claim 1, wherein the anode comprises a metal, and wherein the discharging step is an initial discharging step for the battery that forms a metal oxide in-situ.

4. The method of claim 3, wherein at least 70 wt % of the metal of the anode is converted to a metal oxide in the initial discharging step.

5. The method of claim 1, further comprising:
    converting at least a portion of the manganese dioxide to a layered $MnO_2$ structure in response to discharging the cathode to within the $2^{nd}$ electron capacity of the manganese dioxide.

6. The method of claim 1, wherein cycling the battery during use comprises:
    cycling the battery without a constant voltage step.

7. The method of claim 1, wherein discharging the cathode to within the $2^{nd}$ electron capacity of the manganese dioxide comprises discharging the cathode to at least 20% of a full $2^{nd}$ electrode capacity of the cathode.

8. The method of claim 1, wherein the manganese dioxide comprises manganese dioxide($MnO_2$), electrolytic manganese dioxide, natural manganese dioxide, chemically modified manganese dioxide, $\alpha\text{-}MnO_2$, $\beta\text{-}MnO_2$, $\gamma\text{-}MnO_2$, $\delta\text{-}MnO_2$, $\varepsilon\text{-}MnO_2$, $\lambda\text{-}MnO_2$, birnessite, pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide, or any combination thereof.

9. The method of claim 1, wherein the cathode further comprises: nickel, nickel oxyhydroxide, nickel hydroxide, silver, silver oxide, copper, copper hydroxide, lead, lead hydroxide, lead oxide, and a combination thereof.

10. The method of claim 1, wherein the conductive carbon is a primary synthetic graphite; a natural flake graphite; a dispersion; a carbon black; an acetylene black; a single or multi-walled carbon nanotube; or carbon a metal, a nickel or copper plated carbon nanotube; a graphene; a graphyne; a graphene oxide; a natural graphite; and combinations thereof.

11. The method of claim 1, wherein the cathode further comprises a binder, and wherein the binder comprises polytetrafluoroethylene, carboxymethyl cellulose, polyvinyl alcohol, polyvinylidene fluoride, or any combination thereof.

12. The method of claim 1, wherein the electrolyte is acidic, alkaline, ionic liquids, organic-based, solid-phase, gelled, or combinations thereof that conducts lithium, magnesium, aluminum and zinc ions.

13. A method of operating a battery, the method comprising:
    discharging a battery, wherein the battery comprises:
        a cathode comprising manganese dioxide and a conductive carbon,
        an anode comprising: a metal component and a conductive carbon, wherein the metal component comprises a metal, metal oxide, or metal hydroxide, where the metal of the metal component is zinc, lithium, aluminum, magnesium, iron, cadmium and a combination thereof,
        a separator disposed between the anode and the cathode, and
        an electrolyte;
    recharging the battery without using a constant voltage step, wherein discharging the battery comprises discharging the cathode to within a $2^{nd}$ electron capacity of the manganese dioxide at a C-rate of equal to or slower than C/10, wherein the manganese is in the form of $Mn^{4+}$ in the manganese dioxide, and wherein at least a portion of the manganese is converted to $Mn^{2+}$ during the discharging; and
    cycling the battery during use a plurality of times.

14. The method of claim 13, further comprising: discharging the cathode to within the $2^{nd}$ electron capacity of the manganese dioxide to at least 20% of a full $2^{nd}$ electrode capacity of the cathode.

15. The method of claim 13, wherein the manganese dioxide comprises manganese dioxide($MnO_2$), electrolytic manganese dioxide, natural manganese dioxide, chemically modified manganese dioxide, $\alpha$-$MnO_2$, $\beta$-$MnO_2$, $\gamma$-$MnO_2$, $\delta$-$MnO_2$, $\epsilon$-$MnO_2$, $\lambda$-$MnO_2$, birnessite, pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide, or any combination thereof.

16. The method of claim 13, wherein the cathode further comprises: nickel, nickel oxyhydroxide, nickel hydroxide, silver, silver oxide, copper, copper hydroxide, lead, lead hydroxide, lead oxide, and a combination thereof.

17. The method of claim 13, wherein the conductive carbon is TIMREX Primary Synthetic Graphite (all types), TIMREX Natural Flake Graphite (all types), TIMREX MB, MK, MX, KC, B, LB Grades(examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite and combinations thereof.

18. The method of claim 13, wherein the cathode further comprises a binder, and wherein the binder comprises polytetrafluoroethylene, carboxymethyl cellulose, polyvinyl alcohol, polyvinylidene fluoride, or any combination thereof.

19. The method of claim 13, wherein the electrolyte is acidic, alkaline, ionic liquids, organic-based, solid-phase, gelled, etc. or combinations thereof that conducts lithium, magnesium, aluminum and zinc ions.

20. The method of claim 13, wherein the discharging and recharging occur between upper and lower cell potentials, and wherein the upper and lower cell potentials used are between 0 and 3V vs zinc (Zn).

21. The method of claim 13, wherein the discharging and recharging occur between upper and lower cell potentials, and wherein the upper and lower cell potentials used are between −1.4 V and 1.6 V vs Hg/HgO.

22. The method of claim 13, wherein a number of electrons accessed during the discharging can range between greater than or equal to 1 and less than or equal to 1.5.

\* \* \* \* \*